(12) United States Patent
Tewes et al.

(10) Patent No.: US 7,865,606 B1
(45) Date of Patent: Jan. 4, 2011

(54) ADAPTER FRAMEWORK

(75) Inventors: Martin Tewes, Dossenheim (DE); Joachim Fitzer, Schriesheim (DE)

(73) Assignee: SAP AG, Walldorf (DE)

( * ) Notice: Subject to any disclaimer, the term of this patent is extended or adjusted under 35 U.S.C. 154(b) by 1460 days.

(21) Appl. No.: 10/677,095

(22) Filed: Sep. 30, 2003

Related U.S. Application Data

(60) Provisional application No. 60/433,327, filed on Dec. 13, 2002.

(51) Int. Cl.
*G06F 15/16* (2006.01)

(52) U.S. Cl. ............... 709/230; 709/203; 709/223; 709/224; 709/227

(58) Field of Classification Search .......... 709/206, 709/207, 203, 230, 223, 224, 227
See application file for complete search history.

(56) References Cited

U.S. PATENT DOCUMENTS

| | | | |
|---|---|---|---|
| 6,452,691 B1 * | 9/2002 | Marshall | 358/1.15 |
| 6,684,088 B1 * | 1/2004 | Halahmi | 455/566 |
| 2002/0026533 A1 * | 2/2002 | Dutta et al. | 709/313 |
| 2002/0059410 A1 * | 5/2002 | Hara et al. | 709/223 |
| 2002/0116505 A1 * | 8/2002 | Higgins et al. | 709/227 |
| 2002/0160771 A1 * | 10/2002 | Massie et al. | 455/426 |
| 2003/0009418 A1 * | 1/2003 | Green et al. | 705/38 |
| 2004/0107196 A1 * | 6/2004 | Chen et al. | 707/4 |
| 2005/0138432 A1 * | 6/2005 | Ransom et al. | 713/201 |
| 2005/0177507 A1 * | 8/2005 | Bandych et al. | 705/40 |
| 2006/0230124 A1 * | 10/2006 | Belfiore et al. | 709/219 |
| 2008/0133263 A1 * | 6/2008 | Callan et al. | 705/1 |

* cited by examiner

*Primary Examiner*—Barbara N Burgess
(74) *Attorney, Agent, or Firm*—Mintz, Levin, Cohn, Ferris, Glovsky & Popeo, P.C.

(57) ABSTRACT

A framework for communicating between central message exchange server and one or more heterogeneous external data sources includes an adapter engine. The adapter engine includes an instantiation of one or more adapters. Each adapter is configured to connect, via messaging, an external data source operating using a native message format and the central message exchange server using an extensible markup language (XML) messaging format.

16 Claims, 7 Drawing Sheets

ADAPTER FRAMEWORK

CROSS REFERENCE TO RELATED APPLICATIONS

This application claims priority to U.S. Provisional Patent Application No. 60/433,327, filed on Dec. 13, 2002.

BACKGROUND

The following description relates to business systems, for example an exchange infrastructure for collaborative business systems.

Companies face an increasing need for integration of and collaboration among their information and enterprise software systems. In most current system landscapes, many components are directly connected in a one-to-one relationship with other components, with the integration capabilities hardwired into the application components and individual mappings programs. Under these conditions, collaborative sharing of information or process control is difficult if not impossible. Upgrades, changes, or extensions to an infrastructure of directly connected components are challenging and resource-intensive.

Electronic business collaboration, however, increasingly requires connectivity among all applications inside and outside of company boundaries. Networks such as the Internet provide opportunities for systems to communicate almost instantly with other systems or individuals. Business processes that once were restricted to intranets and their users are now moving to the Internet to become an effective composition of Web services. A Web service is a programmable, self-contained, self-describing, modular application function that can be published, discovered or invoked through an open Internet standard.

New open protocols and standards like the hypertext transfer protocol (HTTP) and extensible markup language (XML) provide universal connectivity among different messaging systems, however a challenge of technical connectivity can remain, particularly with some legacy systems. A mechanism is needed that can automatically bridge a technical connectivity gap and adapt to various messaging interfaces.

SUMMARY

This document provides an infrastructure to establish connectivity among applications. The infrastructure includes an adapter framework that includes one or more messaging adapters. Adapters provide connectivity from and to a central integration server for applications that cannot do so directly. In particular, the integration server sends and receives simple object access protocol (SOAP) messages over HTTP, according to which the adapters connect message-sending applications that employ a different protocol. In one implementation, the adapters provide Java messaging service (JMS), JDBC, file I/O and a generic SOAP handler over HTTP.

In one aspect, a framework for communicating between central message exchange server and one or more heterogeneous external data sources includes an adapter engine. The adapter engine includes one or more adapters. Each adapter is configured to connect, via messaging, an external data source operating using a native message format and the central message exchange server using an extensible markup language (XML) messaging format. In an implementation, the adapter engine is a pure Java (J2SE) application, which offers standards for database access, queue systems and generally guarantees platform neutrality.

The Adapter Engine includes no persistence layer, and therefore employs a synchronous connection to the integration server at runtime. A transactional processing (guaranteed delivery) of the adapters is implemented for asynchronous messages and discussed in more detail below.

In accordance with another aspect, a method for communicating between central message exchange server and one or more heterogeneous external data sources is disclosed. The method includes instantiating an adapter based on a message format used by the external data source. The adapter is configured to communicate with the central message exchange server via XML. The method further includes connecting the external data source to the central message exchange server via the adapter, and communicating data between the external data source and the central message exchange server through the adapter.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to an adapter framework for communicating between a centralized message exchange and a number of external systems that employ various communication standards and protocols.

Figure 1:
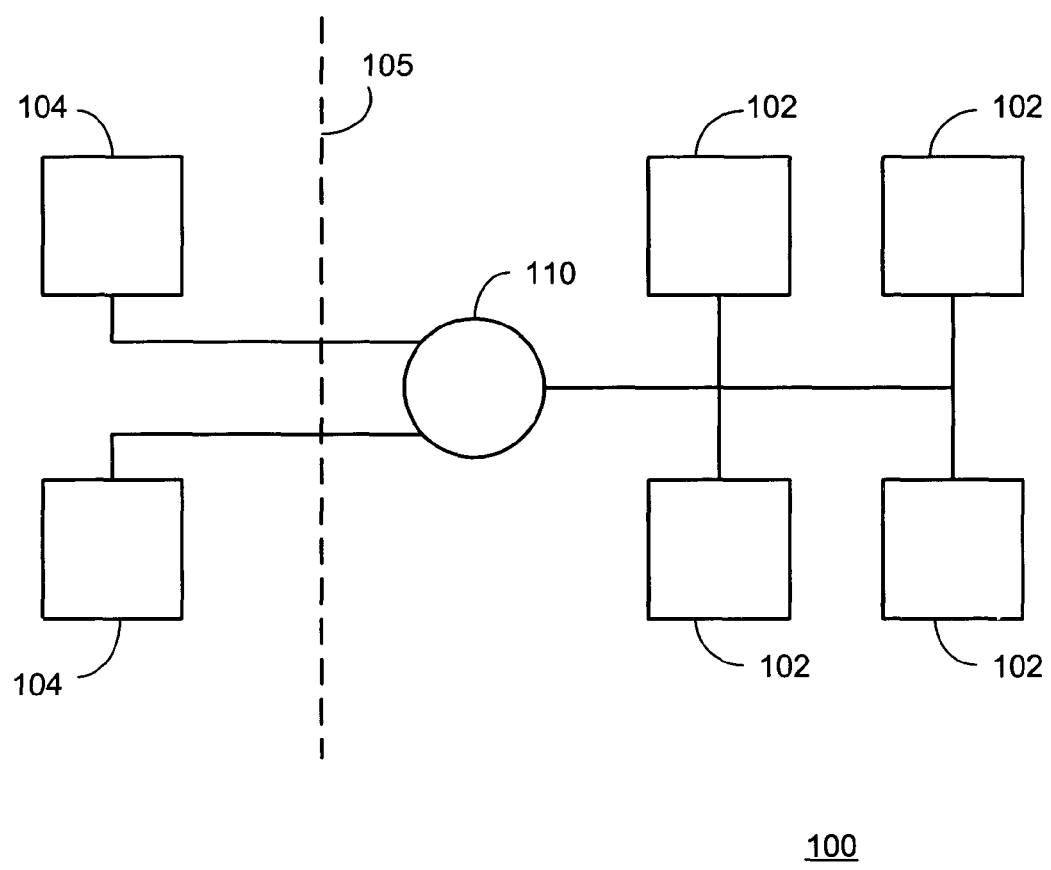
FIG. 1 is a block diagram of an exchange system for integrated, message-based collaboration.

FIG. 1 is a simplified block diagram of a system 100 for integration and "loose coupling" (i.e. message-based interaction) of applications. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components

102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
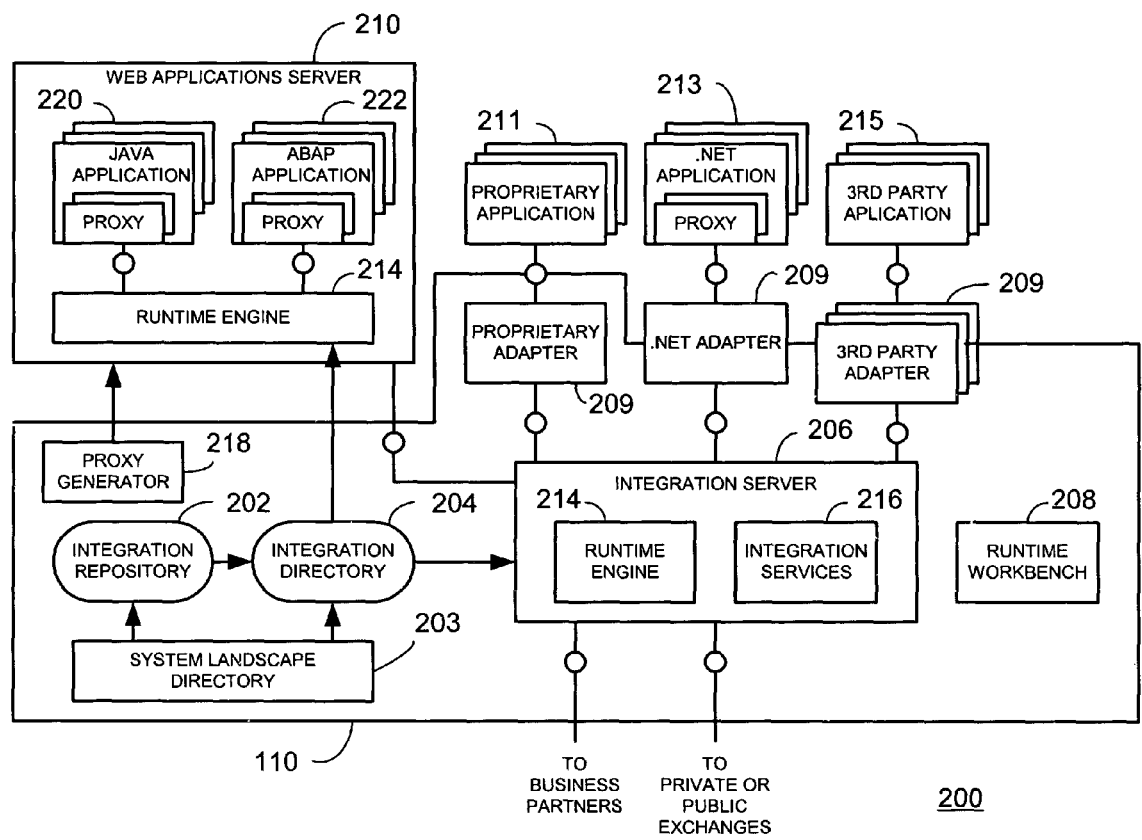
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 also includes integration services 216 that typically require an application-specific implementation. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that may be included within an adapter framework (not shown) that enables connectivity between the integration server 206 and proprietary applications 211, Web-based services 213, and third party applications 215. The adapters 209 serve as a bridge to connect external data sources to the integration server 206. The adapter framework may include general services available for all adapters, as described in further detail below. These general features include connectivity between external components and XI 110 components, transactional processing support, remote configurability, and monitoring, logging, and error handling.

The XI 110 can also include Web applications server 210 that provides Web-based applications programmed according to standard computing platforms using web-specific programming languages such as Java and ABAP, for instance. The Web applications server 210 also includes an instance of the runtime engine 214 for providing messaging and business process control between Web-based applications such as Java applications 220 and ABAP applications 222, and other components.

New interfaces for software components can be defined using an application component employing a proxy, which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented based on the proxy that represents the interface description of the respective development platform, such as Java, ABAP, and .NET for the web-based applications 213. The proxies convert platform-specific data types into XML and provide access to the component-specific local runtime engine. On the outbound side, proxies are generated completely. Outbound proxies can be called via a service invocation provided by an application's developer. On the inbound side, only proxy skeletons need to be generated, as implemented by the receiving application.

Figure 3:
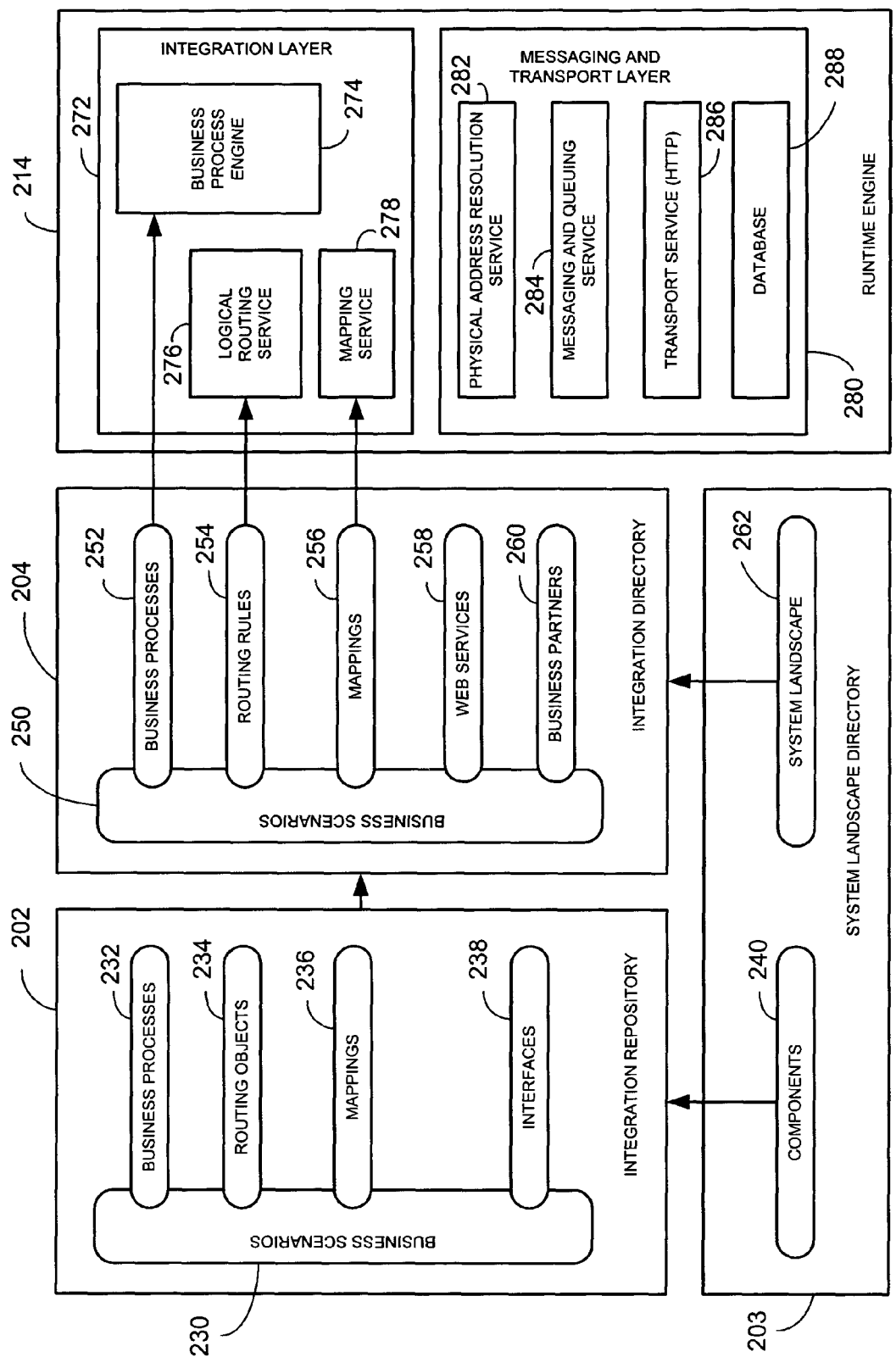
FIG. 3 is a block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are pointers that point to a specific part of a message. They are predefined criteria to determine potential receivers of messages that must be distributed between components and business partners during collaborative processing. Information about the routing objects is used for receiver determination. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, only component-type information, independent of actual installation, is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java or use routing objects 234. The runtime engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The runtime engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The runtime engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 260 defines information for business partners of an enterprise, such as names, addresses, and URLs, but may also contain more detailed and sophisticated information. For instance, the business partners 260 may include a description of the message formats that can be directly received and processed, or of security protocols used for safe communications, or trading terms that are employed in the partnership. The kind of information stored in business partners 260 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes the collaborative runtime environment or Web application server 210, either of which can include an instance of the runtime engine 214 in accordance with informational resources provided by the integration directory 204.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
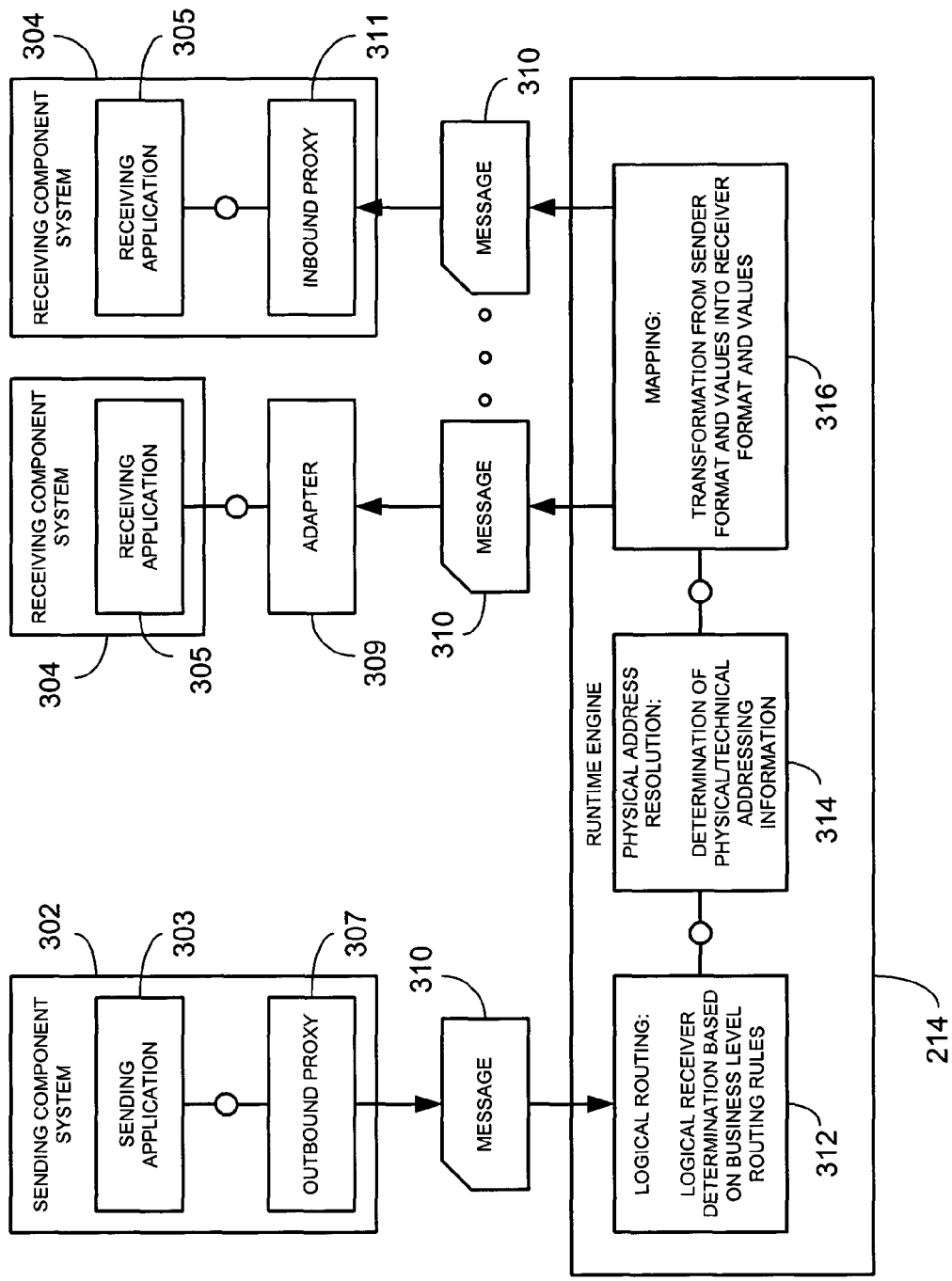
FIG. 4 is a block diagram illustrating a process for communicating a single message between two applications.

FIG. 4 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender, which is already known.

With reference also to FIGS. 2 and 3, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as Xpath expressions or Java code. The mapping service 278 determines the required transformations that depend on message, sender, and sender interface, as well as the receiver and receiver interface, at 314. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer, messaging, queuing, and transport services 284 move the message to the intended or required receiver(s). After the message is transformed into the format expected by each receiver, the physical address of the required receiver service and other relevant attributes are retrieved from the integration directory 204 and mapped to the message, at 316.

A queuing engine in the messaging and queuing service 284 stores ingoing, outgoing, erroneous, and work-in-progress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both an HTTP client and server. The transport service 286 implements an HTTP client that enables outbound communication and an HTTP server that handles inbound communication by accepting incoming documents. Additional server functions can address situations in which the receiver has no HTTP server by supporting polling over HTTP.

Figure 5:
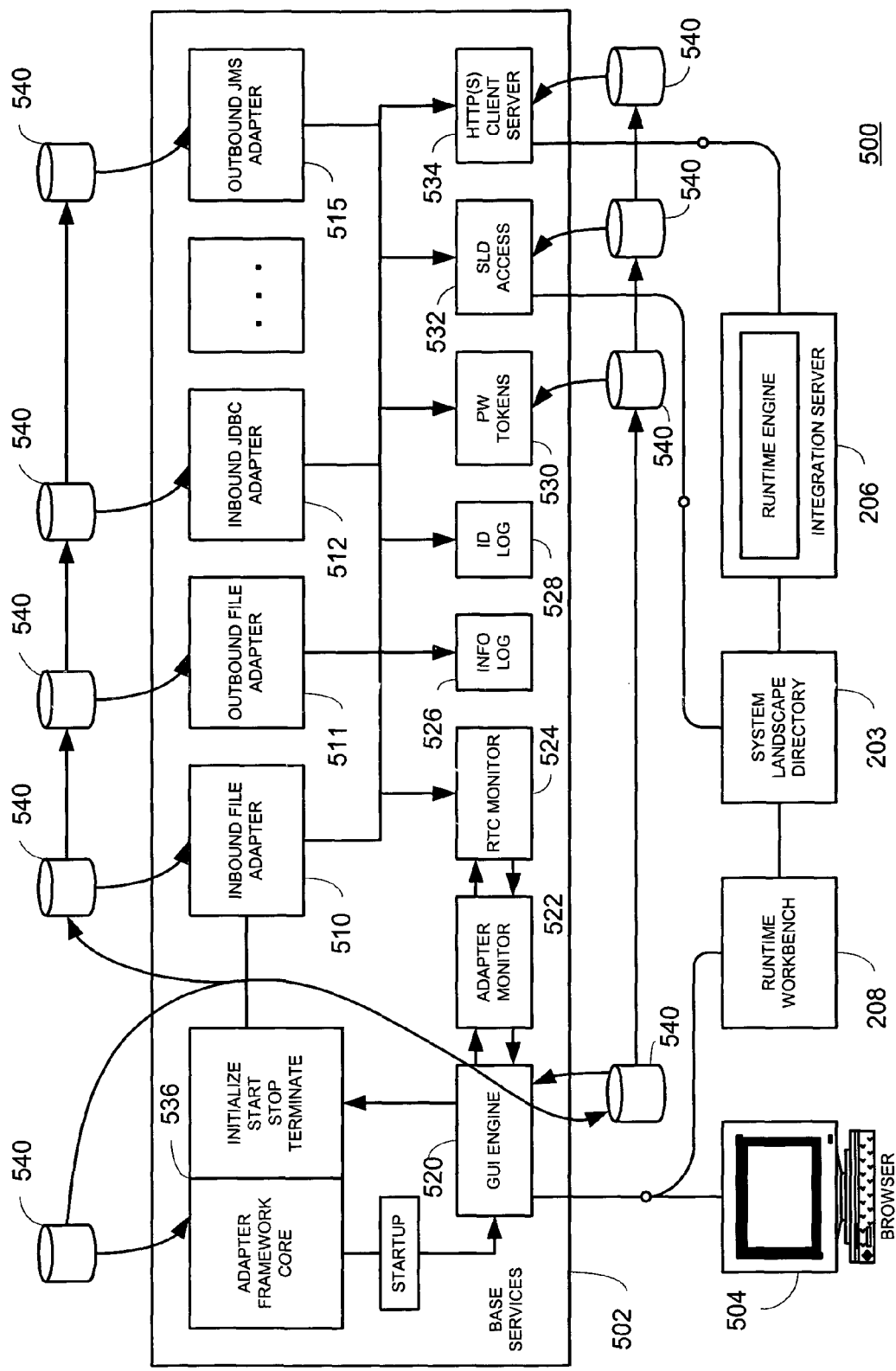
FIG. 5 is a block diagram of an adapter framework for collaborative messaging.

As discussed above with reference to FIG. 2, the XI 110 employs a number of adapters 209 in an adapter framework for connecting with application components 211, 213 and 215 in the system landscape 200. The adapters 209 enable the runtime engine 214 to talk to different application components in accordance with any number of communication standards. FIG. 5 shows an adapter framework 500 in more detail. The adapter framework 500 includes an adapter engine 502, a server application that hosts one or more adapter instances of one or more adapter types. The adapter engine 502 can be implemented as a pure Java (J2SE) application, and can be hosted on any one of a number of operating systems. The adapter engine 502 includes no persistence layer, therefore synchronous connection to the integration server 206 is required at runtime.

Each adapter instance has a logical, unique name, and can be configured, created, started, stopped and terminated inside the adapter engine 502. Any number of adapters can be hosted inside the adapter engine 502, although preferably by default at configuration time one inbound/outbound adapter pair (i.e. messages into and out of the integration server 206, respectively) is instantiated for each requested adapter type. For instance, if an adapter is instantiated for a particular file type, by default the adapter engine will instantiate an inbound file adapter 510 for receiving inbound message files, and an outbound file adapter 511 for transmitting outbound message files. The adapters can include JDBC adapters 512, JMS adapters 515, and/or their inbound/outbound pair. Other adapters can be configured for simple SOAP, Idoc, RFC, and plain HTTP message types. The correct outbound and/or inbound adapter can be selected dynamically via different types of endpoints. For example, a special type of outbound adapter could be activated using only the configuration of endpoints in the integration directory. The parameters necessary for calling a receiver, for instance, are at least a part of the endpoint (i.e. port, host, and/or destination) and one or more security objects.

The adapter engine 502 hosts several base services that are used for or by all hosted adapters. The services can be started at the adapter engine 502 startup time. The base services include a GUI engine 520 that implements a HTTP(S) server for a browser 504 user interface (UI). The services also include an adapter monitor 522 for dispatching the incoming configuration, administration and monitoring tasks from the UI. The adapter monitor 522 can be implemented with generic access to all adapter engine, adapter and service configuration parameters.

Other services include an RtcMonitor 524 that handles requests sent from the runtime workbench 208, such as ping and self-test requests, as described further below. An information log (InfoLog) 526 is a service that handles all monitoring information presented in the UI for each running adapter. An identification log (IDLog) 578 tracks message identifiers (messageIDs) captured by adapters in an "Exactly Once (In Order)" mode. The IDLog can be a small, tile-based database used for the message identifier tracking. A password tokens (Pwtokens) 530 service provides for replacement of passwords in any adapter configuration with a token. At runtime, the PWtokens 530 service replaces the tokens with the real passwords on the fly. The passwords can be collected in an external tile-based database in a scrambled format.

A system landscape directory access (SLD access) 532 service connects to system landscape directory 203 of the XI installation. Once configured, it registers the adapter framework 502 and its adapters at startup time, and the adapters may use the service at runtime for read access to the system landscape directory 203. A HTTP(S) Client/Server service includes an HTTP(S)-Server implementation for all outbound adapter types (i.e. retrieving messages from the integration server 206). The server can be configured to use basic authentication, and to act as an HTTP- or HTTPS-Server. For the inbound adapter types, HTTP or HTTPS requests can be sent to the integration server, respectively.

The adapter engine 502 supports a number of protocol types used by the integration server 206, such as "Best Effort," "Exactly Once" (EO), and "Exactly Once In Order" (EOIO). In EO/EOIO mode, all adapters are configured to guarantee that incoming messages from the Integration Server are persisted exactly once in a connected data source 540, and that outgoing messages read from the data source 540 are processed exactly once in the integration server 206, respectively. The adapter engine 502 does not include a persistence layer for the transported messages themselves, but does include a persistency used by all adapters for storing state information describing the processing state of a message.

When installed inside a system landscape, the adapter engine 502 may register itself in the system landscape directory 203. With this, the adapter framework becomes "visible" within the central XI monitoring tool, the runtime workbench 208. From the runtime workbench 208, availability and checks (such as ping and self-test) can be performed, and installation information can be retrieved. The configuration UI of the adapter engine 502 is also accessible through the runtime workbench 208.

Once the adapter engine 502 is started, any standard Internet browser 504 can connect to configuration services via an adapter framework core 536 to run adapters and handle administration tasks. A user may initialize, start, stop, configure, terminate, and view monitoring information of each installed adapter via control mechanism 538. Detailed trace files may be stored for analysis purposes. A test environment may also be provided with basic test options for the adapter I/O check. All settings are available with common Internet browsers 504 for remote or local administration and monitoring. The adapter configurations may be stored locally inside the adapter framework core.

As a prerequisite for the central monitoring and administration, any adapter engine 502 running inside an XI landscape can connect itself directly to the system landscape directory 203 of the XI installation and report its basic configuration data to the system landscape directory 203. In addition to writing information to the system landscape directory 203, the adapters may also read information from the system landscape directory 203 for centralized configuration. Inbound adapters may also query the association between a sender and the integration server 206 from the system landscape directory 203, retrieving the URL endpoint of the integration server 206 from this query.

The runtime workbench 208 can display any number of adapter engines 502 that have registered to the system landscape directory 203. The runtime workbench 208 can be configured to perform a variety of functions with each adapter engine 502, including but not limited to, display the adapter instances installed on the adapter engine, run a heartbeat (i.e. ping) check on the adapter engine for availability of the adapter engine and/or adapter instance(s), run a self-test on the adapter engine, and read out basic system settings of the adapter engine's host. In addition to these integrated functions, the runtime workbench 208 can start the configuration GUI of the adapter engine 502 to provide access to all administration options, including log entries of the adapters from the IDLog 528.

Adapter-specific errors include configuration errors and runtime errors. Both types of errors can be reported in the adapters' log information. If an adapter cannot be initialized due to errant configuration information (i.e. configuration error), it cannot be started. If an adapter can be started but is unable to process a message (i.e. runtime error), it will automatically do a retry on the message after a specified interval. However, if the reason for this runtime error is a configuration problem, it will have to be configured properly and then restarted manually to proceed error-free.

Figure 6:
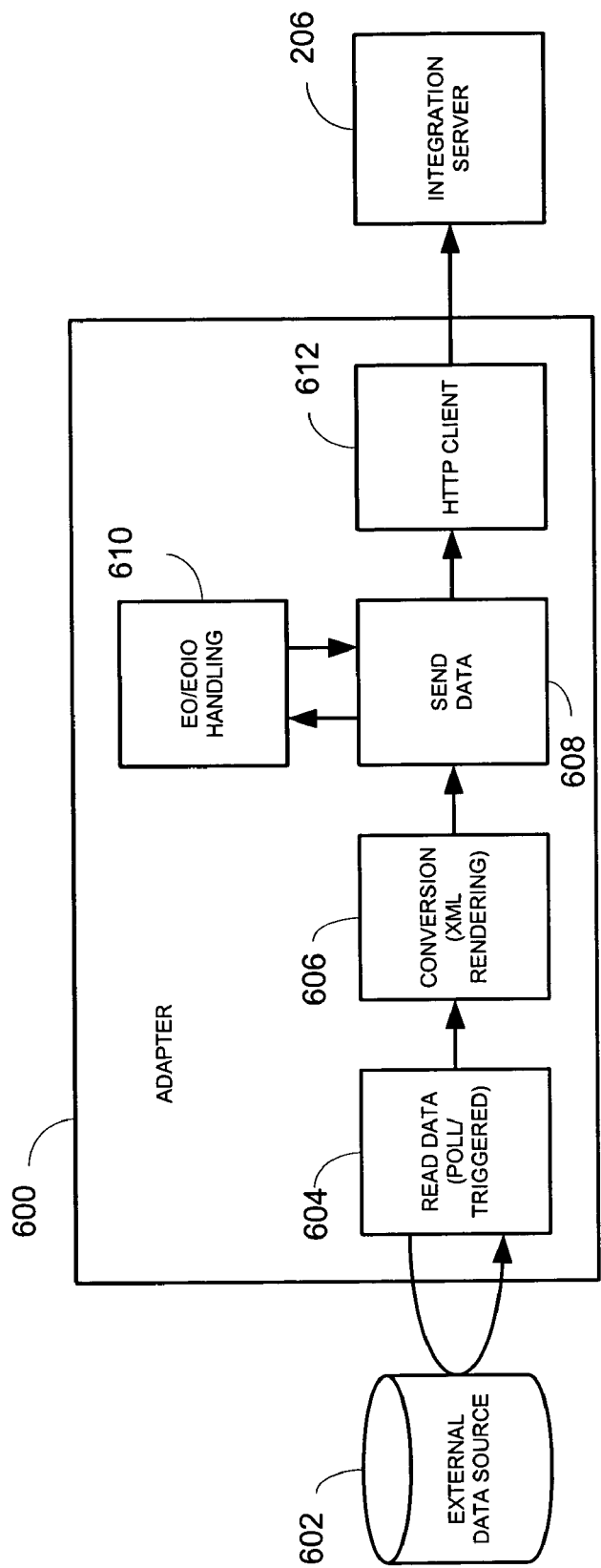
FIG. 6 is a flow diagram illustrating data processing in an inbound adapter from an external data source to the integration server.

FIG. 6 is a flow diagram illustrating data processing in an inbound adapter 600 from an external data source 602 to the integration server 206. At block 604, data is read or extracted from the external data source 602 is performed, whereby the inbound adapter 602 polls its external data source 602 or is triggered if data is available. Polling is conducted if, for example, the external data source 602 is a file system and the adapter 600 is a file adapter, or a database for a JDBC adapter. Triggering can occur if for example, the external data source 602 includes a JMS event and the adapter 600 is a JMS adapter, or an HTTP request occurs for a SOAP adapter.

At block 606, the retrieved data may be converted from a format native to the external data source to a format used by the integration server, such as XML. Depending on the configuration of the system landscape and the XI, conversion may be optional. For instance, file and JMS adapters may receive external data formats that are not XML but can be formatted very easily (e.g., a file with simple csv-format or fixed column lengths). Also simple data structures that include separated, different formats can be recognized and formatted. In the latter case, an additional step using a XML-rendering, which needs little or no additional meta data configuration information, can be provided by the adapter 600 to produce an XML payload. Under this scenario, a file adapter can also generate a file split, wherein a file may be split up in several record sets, each sent as an independent message to the integration server 206. Also, this scenario can be enabled under the "Exactly Once" protocol so that no part of a document will be lost or duplicated if the processing is interrupted during the file split. In a JDBC adapter, a JDBC resultset can be converted to an XML stream by default. A SOAP adapter and the JMS adapter may invoke additional, free defined conversion classes.

At block 608, data (converted or not) is sent to the integration server 206. This step includes generating a message that conforms to a protocol used by the XI. This message will includes the data as a payload, and use an HTTP client to send the message over HTTP(S) to the integration server 206 at block 612. If a quality of service type "Exactly Once (In Order)" (EO/EOIO) is specified for the message, the message identifier is persisted at block 610 and used to retry sending the message in case of a failure at block 608. If the message is sent successfully to the integration server 206, a confirmation acknowledgement is processed at block 610 to prevent the data from being sent again in another message.

FIG. 6 is a flow diagram illustrating data processing in an outbound adapter 618 from the integration server 206 to an external data source 602. As illustrated by block 620, each outbound adapter is registered to a unique service of an HTTP server, and receives the messages that the integration server 206 sends to the URL associated with the HTTP server. Data is then received and extracted from the message at block 622, and in the case of an EO/EOIO message type, the message identifier is extracted for EO/EOIO handling at block 624.

At block 626, a conversion from an XI format to a format native to the external data source 602 can be executed. As discussed above, depending on the configuration of the system, conversion is optional. File and JMS adapters may format simple-structured XML documents to text files consisting of csv- or fixed-length columns and filled rows. Also simple structures containing different formats can be formatted to csv formats. In a JDBC adapter, a specific XML-document format is expected that can be converted to an SQL-INSERT statement for a specified database table. A SOAP adapter and a JMS adapter may invoke additional, free defined conversion classes.

At block 628, the data is written to the external data source, and the message is marked as processed in the case of an EO processing mode. If an error occurs, the error is reported back to the integration server 206, and the message can be sent repeatedly until processing is reported as successful.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 7:
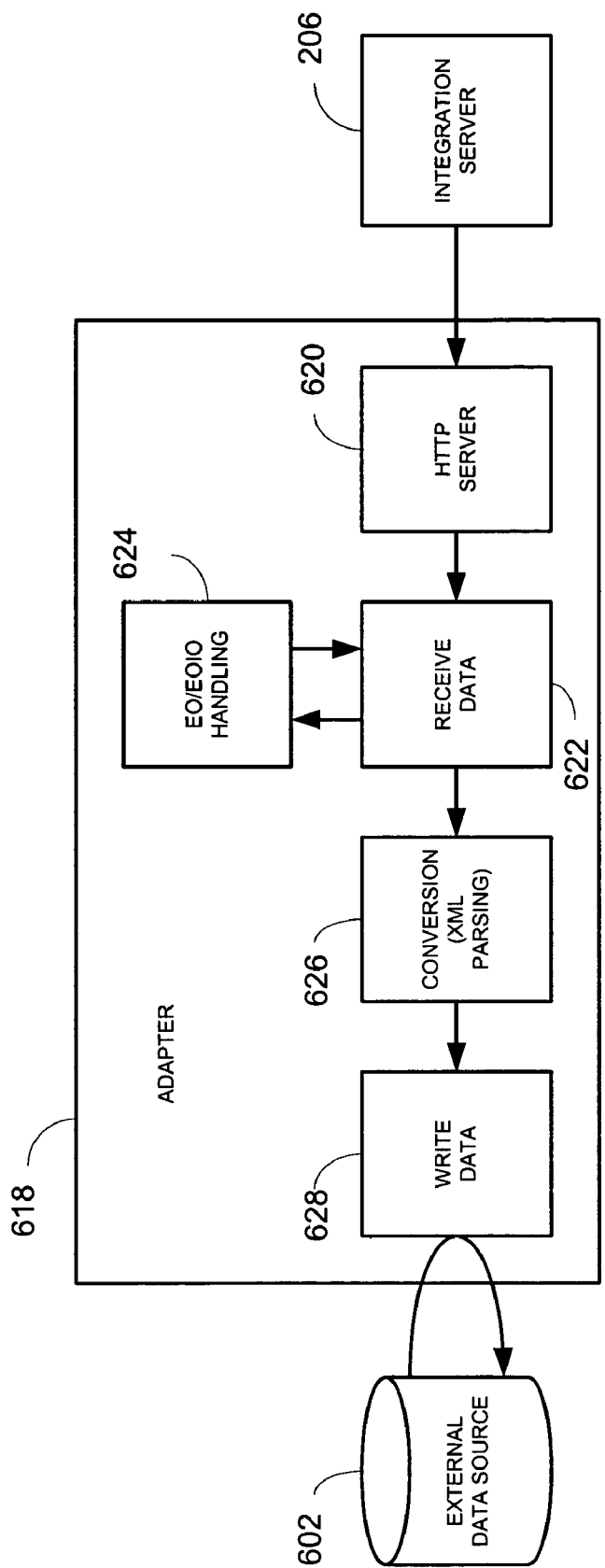
FIG. 7 is a flow diagram illustrating data processing in an outbound adapter from the integration server to an external data source.

Although a few embodiments have been described in detail above, other modifications are possible. Portions of this disclosure discuss operation though a portal, but any of a number of access systems and methods may be used to manage collaboration sessions. The logic flows depicted in FIGS. 6 and 7 do not require the particular order shown, or sequential order, to achieve desirable results. Other embodiments may be within the scope of the following claims.

The invention claimed is:

1. A method comprising:
receiving, at an exchange infrastructure implemented on one or more processors, data from a heterogeneous external data source implemented on one or more other machines, the data comprising a data format that is native to the heterogeneous external data source and not compliant with any of one or more extensible markup language protocols used by an integration server of the exchange infrastructure;
instantiating, using an adapter engine implemented on the exchange infrastructure, an inbound adapter based on the data format used by the heterogeneous external data source, the adapter engine configured to dynamically instantiate and host a plurality of inbound and outbound adapter pairs, each of the plurality of inbound and outbound pairs being instantiated for an associated data format used by one of a plurality, of heterogeneous external data sources, each of the instantiated inbound and outbound adapter pairs adapted to be configured, created, started, stopped, and terminated;
generating, at the inbound adapter, a message that conforms to at least one of the one or more extensible markup language protocols used by the integration server, the message comprising at least part of the data received at the exchange infrastructure;
persisting, at the inbound adapter, a message identifier that identifies the message for re-sending of the message in case delivery of the message to the integration server fails;
passing, through the inbound adapter, the message to the integration server;
receiving, at the inbound adapter from the integration server, a confirmation acknowledgement confirming receipt of the message by the integration server; and
processing, at the inbound adapter, the confirmation acknowledgment to prevent the message from being resent.

2. The method in accordance with claim 1, wherein the message generated by the inbound adapter is an XML message.

3. The method in accordance with claim 1, further comprising:

instantiating, at the one or more processors, an outbound adapter based on the data format used by the heterogeneous external data source;

converting, by the outbound adapter, an outbound message from the integration server to the heterogeneous external data source, the converting comprising converting the outbound message from one of the one or more extensible markup language protocols used by the integration server to the data format that is native to the heterogeneous external data source; and sending the outbound message from the outbound adapter to the heterogeneous external data source.

4. The method in accordance with claim 3, wherein the outbound message from the integration server is an XML message.

5. The method in accordance with claim 1, wherein the heterogeneous external data source and the exchange infrastructure communicate via a hypertext transport protocol (HTTP).

6. The method in accordance with claim 1, wherein the exchange infrastructure operates using a simple object access protocol (SOAP).

7. The method in accordance with claim 1, wherein the heterogeneous external data source includes a sending application.

8. The method in accordance with claim 1, further comprising:

monitoring operation of each inbound adapter and presenting monitoring information to a graphic user interface (GUI), by an adapter monitor.

9. The method in accordance with claim 8, further comprising:

generating the GUI and displaying the monitoring information, by a GUI engine.

10. The method in accordance with claim 8, further comprising:

logging the monitoring information by an information log.

11. The method in accordance with claim 8, further comprising:

logging message identifiers of messages communicated through the inbound adapter by an identification log.

12. The method in accordance with claim 1, further comprising:

receiving, at the exchange infrastructure, second data from a second heterogeneous external data source, the second data comprising a second data format that is native to the second heterogeneous external data source and not compliant with any of the one or more extensible markup language protocols used by the integration server;

instantiating, by the integration server on the one or more processors, a second inbound adapter based on the second data format used by the second heterogeneous external data source;

generating, at the second inbound adapter, a second message that conforms to at least one of the one or more extensible markup language protocols used by the integration server, the second message comprising at least part of the second data received at the exchange infrastructure;

persisting, at the second inbound adapter, a second message identifier that identifies the second message for re-sending of the second message in case delivery of the second message to the integration server fails;

passing, through the second inbound adapter, the second message to the integration server;

receiving, at the second inbound adapter from the integration server, a second confirmation acknowledgement confirming receipt of the second message by the integration server; and processing, at the second inbound adapter, the second confirmation acknowledgment to prevent the second message from being resent.

13. The method in accordance with claim 1, wherein the heterogeneous external data source communicates with the exchange infrastructure through a firewall.

14. The method in accordance with claim 1, further comprising:

registering, at a system landscape directory of the exchange infrastructure, an installation of the external heterogeneous data source for collaboration with the exchange infrastructure, the system landscape directory comprising a system landscape that describes internal and external components that are installed and available on certain machines that collaborate via the exchange infrastructure, the external components comprising the external heterogeneous data source;

accessing, by an integration repository of the exchange infrastructure from the system landscape directory, a design-time description of the external heterogeneous data source;

capturing, by an integration directory of the exchange infrastructure at runtime, a configuration-specific collaboration description of the external heterogeneous data source, the configuration-specific collaboration description comprising mappings and routing rules for processing messaging from the external heterogeneous data source; and retrieving, by the integration server from the integration directory, the configuration-specific collaboration description for the external heterogeneous data source for use in instantiating the inbound adapter.

15. A system comprising:

at least one processor; and at least one memory storing instructions that cause the at least one processor to perform operations comprising:

receiving, at an exchange infrastructure implemented on the at least one processor, data from a heterogeneous external data source implemented on one or more other machines, the data comprising a data format that is native to the heterogeneous external data source and not compliant with any of one or more extensible markup language protocols used by an integration server of the exchange infrastructure;

instantiating, using an adapter engine implemented on the exchange infrastructure integration server on the at least one processor, an inbound adapter based on the data format used by the heterogeneous external data source, the adapter engine configured to dynamically instantiate and host a plurality, of inbound and outbound adapter pairs, each of the plurality, of inbound and outbound pairs being instantiated for an associated data format used by one of a plurality of heterogeneous external data sources, each of the instantiated inbound and outbound adapter pairs adapted to be configured, created, started, stopped, and terminated;

generating, at the inbound adapter, a message that conforms to at least one of the one or more extensible markup language protocols used by the integration server, the message comprising at least part of the data received at the exchange infrastructure;

persisting, at the inbound adapter, a message identifier that identifies the message for re-sending of the message in case delivery of the message to the integration server fails;

passing, through the inbound adapter, the message to the integration server;

receiving, at the inbound adapter from the integration server, a confirmation acknowledgement confirming receipt of the message by the integration server; and processing, at the inbound adapter, the confirmation acknowledgment to prevent the message from being resent.

16. An article comprising a non-transitory machine-readable medium configured to provide instructions to at least one programmable processor, the instructions causing the programmable processor to perform operations comprising:

receiving, at an exchange infrastructure implemented on the programmable processor, data from a heterogeneous external data source implemented on one or more other machines, the data comprising a data format that is native to the heterogeneous external data source and not compliant with any of one or more extensible markup language protocols used by an integration server of the exchange infrastructure;

instantiating, using an adapter engine implemented on the exchange infrastructure, an inbound adapter based on the data format used by the heterogeneous external data source, the adapter engine configured to dynamically instantiate and host a plurality, of inbound and outbound adapter pairs, each of the plurality, of inbound and outbound pairs being instantiated for an associated data format used by one of a plurality of heterogeneous external data sources, each of the instantiated inbound and outbound adapter pairs adapted to be configured, created, started, stopped, and terminated;

generating, at the inbound adapter, a message that conforms to at least one of the one or more extensible markup language protocols used by the integration server, the message comprising at least part of the data received at the exchange infrastructure;

persisting, at the inbound adapter, a message identifier that identifies the message for re-sending of the message in case delivery of the message to the integration server fails;

passing, through the inbound adapter, the message to the integration server;

receiving, at the inbound adapter from the integration server, a confirmation acknowledgement confirming receipt of the message by the integration server; and processing, at the inbound adapter, the confirmation acknowledgment to prevent the message from being resent.

* * * * *